United States Patent [19]
Klinger

[11] Patent Number: 5,178,424
[45] Date of Patent: Jan. 12, 1993

[54] POP-OFF QUICK CONNECT INDICATOR

[75] Inventor: Gary Klinger, Allen Park, Mich.

[73] Assignee: ITT Corporation, New York, N.Y.

[21] Appl. No.: 724,225

[22] Filed: Jul. 1, 1991

[51] Int. Cl.$^5$ .............................................. F16L 35/00
[52] U.S. Cl. ...................................... 285/319; 285/93
[58] Field of Search ................... 285/39, 93, 319, 320, 285/921, 3, 4; 29/453

[56] References Cited

U.S. PATENT DOCUMENTS

| | | | |
|---|---|---|---|
| 4,753,458 | 6/1988 | Case et al. | 285/93 |
| 4,793,637 | 12/1988 | Laipply et al. | 285/93 |
| 4,895,396 | 1/1990 | Washizu | 285/319 |
| 4,913,467 | 4/1990 | Washizu | 285/93 |
| 4,915,420 | 4/1990 | Washizu | 285/93 |
| 4,925,217 | 5/1990 | Ketcham | 285/93 |
| 4,946,205 | 8/1990 | Washizu | 285/93 |
| 4,948,176 | 8/1990 | Bartholomew | 285/93 |
| 4,979,765 | 12/1990 | Bartholomew | 285/93 |

FOREIGN PATENT DOCUMENTS 1148191 6/1988 Japan .

Primary Examiner—Eric K. Nicholson
Attorney, Agent, or Firm—Robert P. Seitter; J. Gordon Lewis

[57] ABSTRACT

An insertion indication device for use with a quick connect fitting includes a generally annular base member which is adapted for positioning about a male conduit inside of a connector housing. One or more leg members extend axially from the base member and terminate near an axial opening formed in the housing for receiving the conduit. A generally annular indicator member positioned adjacent to the opening releassably engages the end members. Upon couplings of the male and female elements of the quick connector, the indicator member is separated from the leg members to provide visual conformation that coupling has taken place.

26 Claims, 3 Drawing Sheets

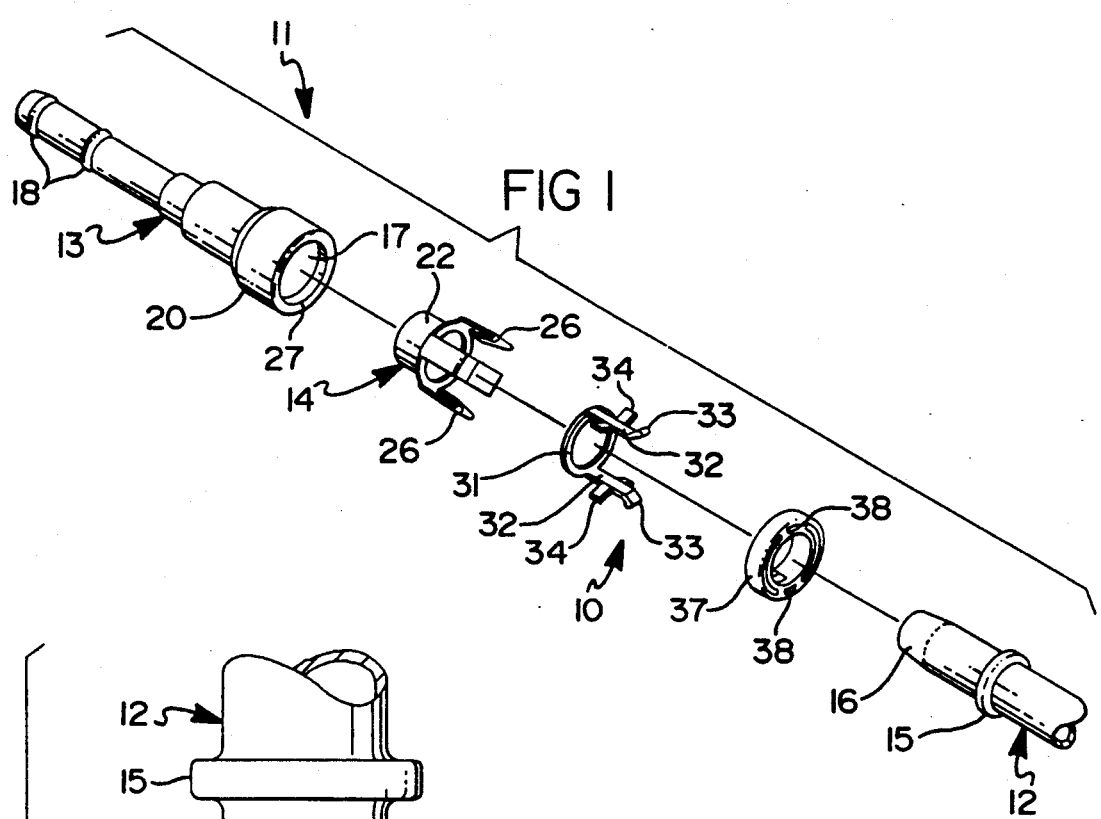
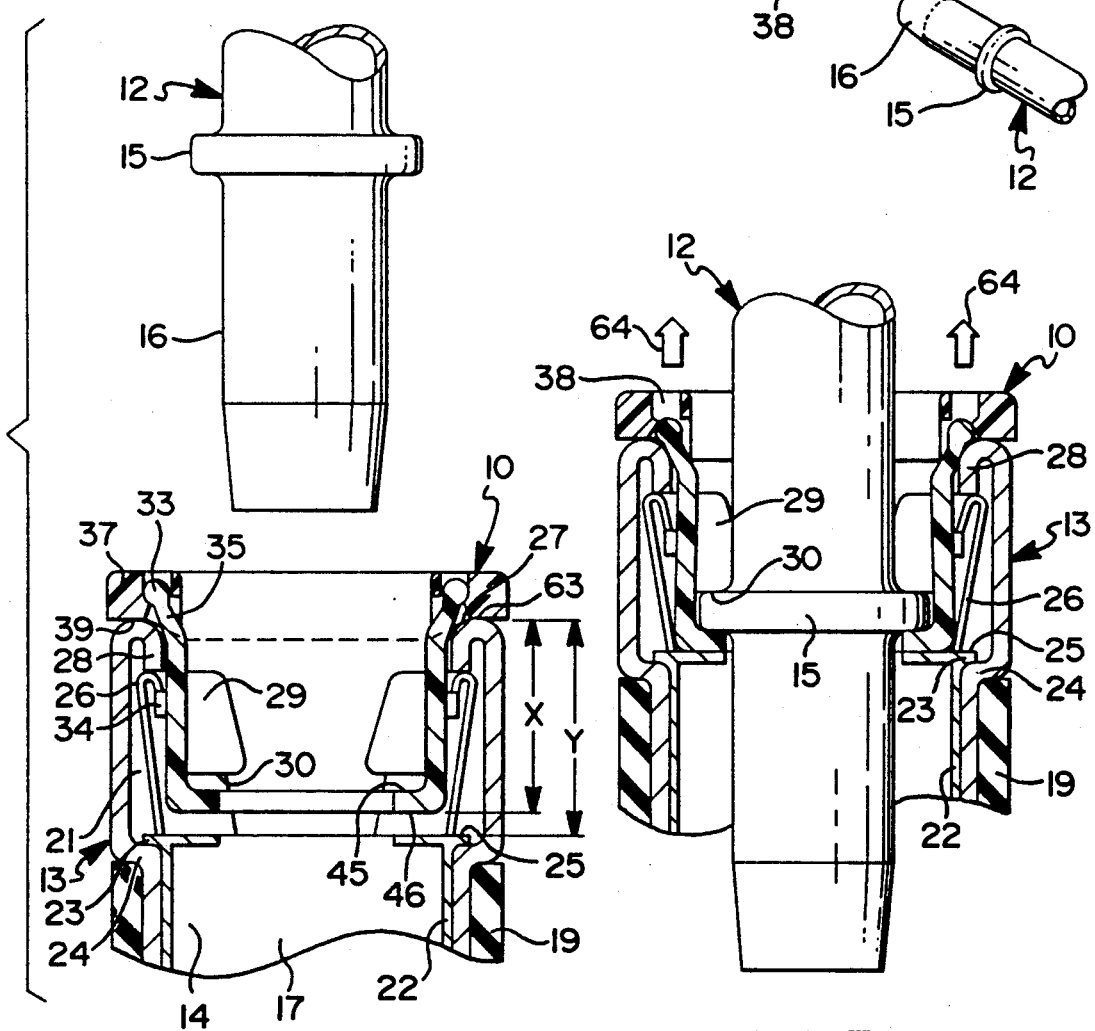

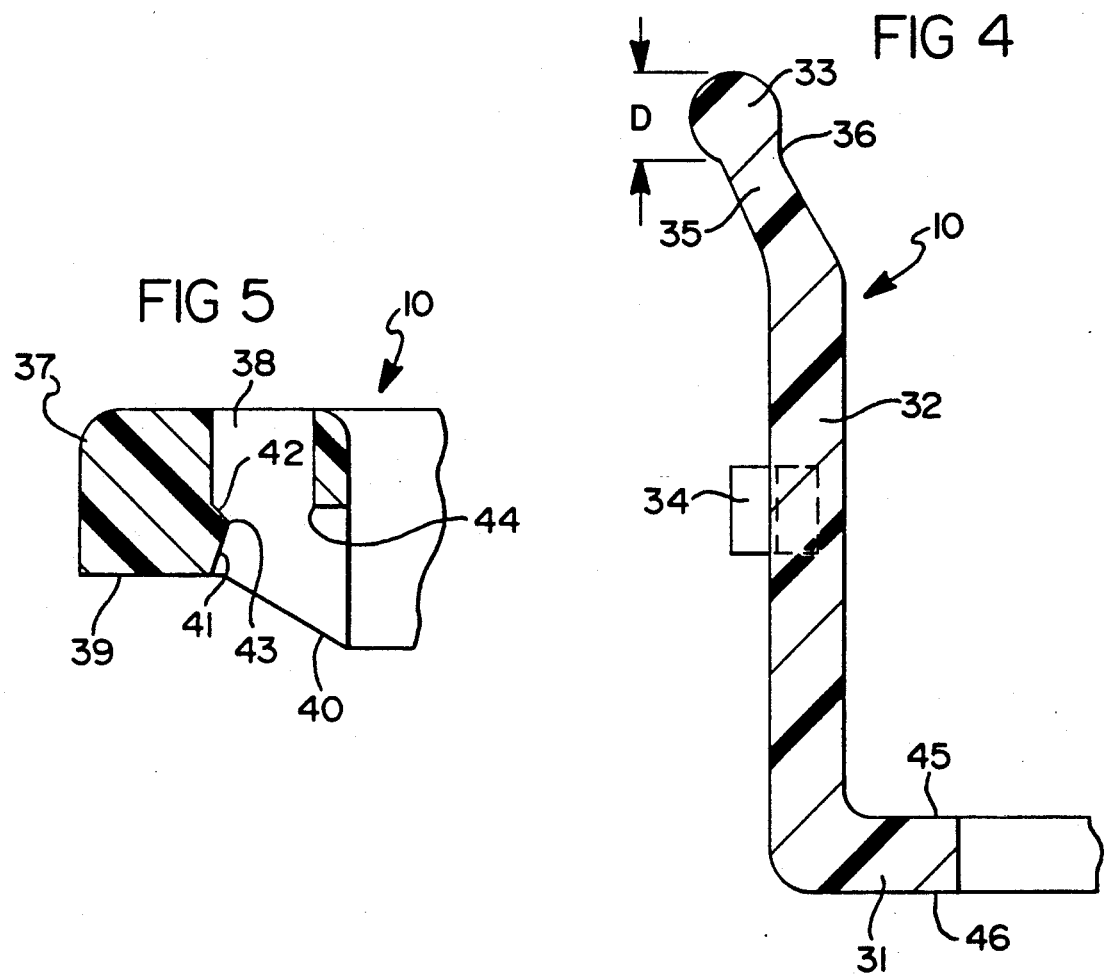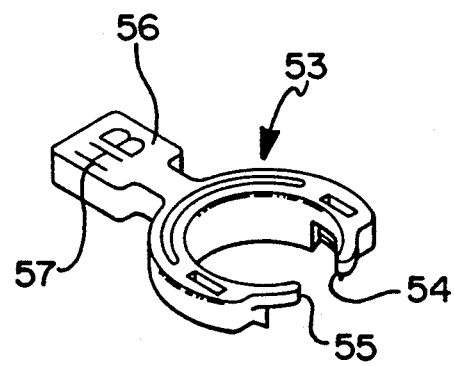

POP-OFF QUICK CONNECT INDICATOR

INTRODUCTION

The present invention relates to quick connectors and, more particularly to quick connectors having a means enabling, by external inspection, determination of proper coupling between the male and female portions of the connector.

BACKGROUND OF THE INVENTION

It is desirable in fluid handling conduits to ensure that the connectors used have their male and female portions properly coupled together. A faulty connector enables an associated host system to leak fluid. This can be particularly disadvantageous when the system is under pressure and the leaking connector expels the pressurized fluid.

In the quick connector field, where male and female portions of the connectors are held together by friction locking members, it is important that the male and female portions be properly coupled. To ensure the proper coupling, the installer may tug on or manipulate the connector to make sure that it is properly coupled. Also, visual types of inspecting devices enable the installer to ensure that the male and female portions are properly coupled together.

U.S. Pat. No. 4,925,217 to Ketcham discloses a quick connector with a visual checking feature wherein a deformable member is assembled within the fitting which includes elongated members extending out of the housing between the male and female portions prior to coupling and which are retracted, and no longer visible, once the coupling has been accomplished. Although, this type of connector may work satisfactorily for its intended purpose, designers are always trying to improve the field. Furthermore, designs such as that employed by Ketcham provide only relatively small axial movement of the indicator member, which, when employed with relatively low cost, high tolerance manufacturing, limits the reliability of the perceived indication and, alternatively, adds additional expense to a more highly refined design. Lastly, the springlike operation of Ketcham's vaulted annular member requires use of relatively expensive materials and can introduce additional failure modes, such as fracture of one of the legs 46 and 48 which could interfere with proper coupling operation.

BRIEF DESCRIPTION OF THE INVENTION

Accordingly, it is an object of the present invention to provide a visual inspection device which enables, at a glance, the installer to ensure proper coupling of the connector. Also, the present invention provides the art with a simple, inexpensive inspection device that overcomes the shortcomings of the prior art described hereinabove. In the broadest sense, a quick connect insertion indicator includes a base member of generally annular configuration which is adapted for positioning about a male conduit within a connector housing. One or more leg members extend axially from the base member and terminate near an axial opening formed in the housing for receiving the conduit. A generally annular indicator member which is positioned substantially concentrically adjacent to the opening is releasably engaged with the leg member terminations. Finally, means are provided operative to axially displace the base and leg members upon engagement of the conduit and connector housing to effect separation of the leg and indicator members. This arrangement provides the advantage of a simple, inexpensive design which features a positive visual confirmation of coupling condition.

In the preferred embodiment of the invention, the insertion indicator includes an annular base member and a plurality of circumferentially spaced axially extending leg members dismensioned such that the leg members terminate externally adjacent a step formed at the axial housing opening. Retention means are carried by one or more of the leg members which are positioned axially inwardly of and which extend radially outwardly of the step opening for retaining the indicator in-assembly with the connector housing. The base member defines an abutment surface disposed to engage a mating abutment surface or upset defined by the conduit to axially displace the base and leg members upon engagement of the conduit and connector housing to effect separation of the leg and indicator members. This arrangement provides the advantage of enabling use of the present invention with existing standard quick connect fittings without the need for expensive modification or retooling. Furthermore, the retention means permit preassembly of the insertion indicator with the connector housing prior to incorporation with a host system and mating with the male conduit.

According to another aspect of the invention, the insertion indicator further includes resilient means operative to forcefully eject the indicator member axial away from the connector housing upon separation from the leg members. This arrangement provides the advantage of "popping" the indicator member off of the remainder of the insertion indicator wherein after it is loosely slidingly retained on a portion of the conduit leading away from the connector housing, thus enhancing its visibility.

According to another aspect of the invention, the small arcuate sector of the indicator member is removed or, alternatively, a rupture point is provided therein, preferably in conjunction with a generally planar tab member which is integrally formed with and radially extending from the indicator member. This arrangement provides the advantage of ensuring retention of the indicator member upon the conduit after coupling has been accomplished and facilitating its removal, if required, thereafter. Furthermore, this aspect renders the indicator member reusable.

According to still another feature of the invention, the free end of the leg members are formed as a bulbous structure which snap or form an interference fit within a mating recess in the indicator member to ensure reliable releasable engagement therebetween. Alternatively, the base and leg members can be formed integrally with the indicator member wherein either the indicator member or the leg members include determined weakened points, such as by reduced cross-sectional area which will predictably fracture upon axial loading occasioned by coupling between the conduit and its mating connector housing.

These and other features and advantages of this invention will become apparent upon reading the following specification which, along with the drawings, describes and discloses preferred and alternative embodiments of the invention in detail.

A detailed description of the disclosed embodiments makes reference to the accompanying drawings.

BRIEF DESCRIPTION OF THE DRAWINGS

FIG. 1, is a perspective exploded view of a conduit quick connector assembly embodying the present invention;

FIG. 2, is a cross-section view, on an enlarged scale, of a demated connector housing and male conduit;

FIG. 3, represents the connector housing and male conduit of FIG. 2 in the coupled condition;

FIGS. 4 and 5, are a broken sectional views of portions of the insertion indicator employed in FIGS. 1 through 3 on a greatly enlarged scale;

FIG. 7, is a perspective view of an alternative embodiment of the indicator member.

DETAILED DESCRIPTION OF THE PREFERRED AND ALTERNATIVE EMBODIMENTS

Figure 6:
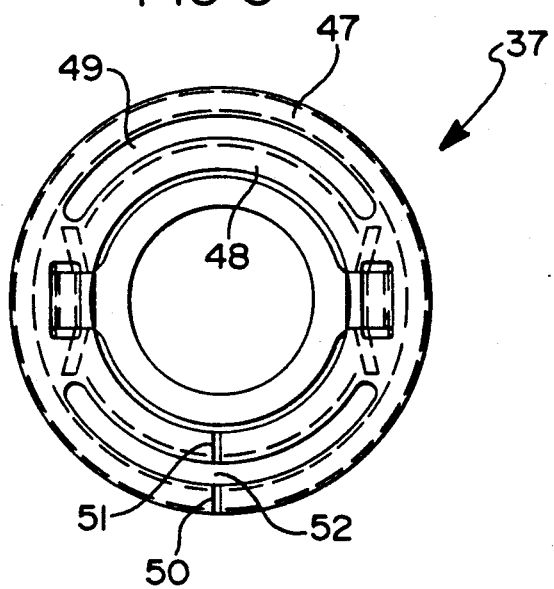
FIG. 6, is a top plan view of the insertion indicator of FIG. 2.

Referring to FIG. 1, the present invention includes an insertion indicator device shown generally at 10 for use with a quick connector shown generally at 11, including male and female elements 12 and 13, respectively, and a locking member or retainer 14. With the exception of modifications described hereinbelow, quick connector 11 is representative of know commercially available devices. The quick connector 11 illustrated herein is adapted for application within systems employing tubular conduit, although it is contemplated that the present invention could be employed with other structural configurations and applications.

Male element 12 is illustrated as a thin wall metallic tube with an upset or external circumferential flange 15 integrally formed therein adjacent an end 16 adapted for insertion within a stepped through-passage 17 in female element 13. The end of female element 13 distal male element 12 has a series of external circumferential barbs 18 adapted for locking engagement with a resilient conduit 19 (see FIGS. 2 and 3). Locking member 14 is carried within an enlarged end 20 of female element 13 proximate male element 12 as will be described in greater detail hereinbelow.

As seen in FIG. 2, the through passage 17 of female element 13 includes a stepped portion 21 within its enlarged end 20. Additional stepped portions may be provided to receive elements such as O-rings or the like (not illustrated) for sealing male element 12.

The retainer 14 comprises a generally tubular base or skirt portion 22 nestingly disposed concentrically within through passage 17 terminating in a radially outwardly extending flange portion 23 received within a step 24 formed in female element 13 at the end thereof opening into step portion 21 and coating therewith to define a seat 25. Four finger members 26 are integrally formed with flange portion 23 and are circumferentially equally spaced thereabout and extend axially therefrom towards an opening 27 defined by a step 28 formed by the end of female element 13 for receiving male element 12. The free end of fingers 26 are folded rewardly to define ramp surfaces 29 on the radially inward surface thereof and terminate in a short radially outwardly directed leg defining an abutment surface 30. The portion of the finger members 26 closest to step 28 is slightly axially spaced therefrom. Retainer 14 is constructed of suitable material such as spring steel.

Insertion indicator device 10 includes an annular base member 31 with two axially extending leg members 32 integrally formed adjacent to the outer diameter thereof and circumferentially opposed from one another. As can best be seen in FIG. 4, leg members 32 are integrally formed with annular base member 31 from virtually any low cost material such as injection molded plastic. FIG. 4 illustrates only one leg member 32, it being understood that each is of similar configuration. Each leg member 32, depends from annular member 31 and extends to an opposed end or point of termination 33. Retention tabs 34 extend generally tangentially and slightly radially outwardly from the axial mid point of each leg member 32, the function of which will be described in detail hereinbelow. Tabs 34 extend circumferentially between adjacent finger members 26 of retainer 14 to ensure proper angular orientation with the indicator device 10. Terminations 33 are formed as a tangentially directed bulbous cylinder angling slightly radially outwardly from the line of elongation of its associated leg member 32 through an intermediate stem 35. The point of transition between stems 35 and terminations 33 forms a neck region 36 best illustrated in FIG. 4. The stem is angled radially outwardly to ensure clearance for subsequent (if required) use of quick connector release tools.

A second part of indicator device 10 includes an annular indicator member 37 which includes two opposed axially opening recesses 38 dimensioned to releasably engage terminations 33 and thereby retain base member 31 and indicator member 37 in a coaxial orientation.

As viewed in FIG. 2, insertion indicator device 10 is illustrated in a first condition indicative of non engagement between male and female elements 12 and 13. The portion of leg members 32 comprising stems 35 and terminations 33 extend axially externally of opening 27 to engage indicator member 37 such that a transverse face 39 of indicator member 37 closest to female element 13 abuts the outwardmost portion (upwardmost as viewed in FIGS. 2 and 3) portion, or transverse face 63, thereof. Tabs 34 are thus trapped axially intermediate step 28 and seat 25 to ensure that the indicator device 10 remains in assembly with female element 13. Thus, indicator member 37, which is preferably injection molded of brightly material color to enhance its visibility is retained concentrically with opening 27.

Referring to FIGS. 4 and 5, indicator member 37 has a central area 40 of increased axial dimension which projects slightly within opening 27 and serves to maintain alignment between indicator member 37 and female element 13. FIG. 5 illustrates only one of two identical recesses 38. The radially outwardmost wall of each recess 38, defines axially adjoining, radially inwardly and outwardly extending ramp surfaces 41 and 42. The common line 43 between surfaces 41 and 42 is positioned radially outwardly of a corner 44 formed in the inner surface of recess 38. Line 33 is radially spaced from corner 44 to form a neck having a charasteric dimension which is somewhat less than the nominal diameter of bulbous termination 33 and somewhat greater than the radially thickness neck region 36. Thus, leg members 32 are assembled with indicator member 37 by axially pressing the two together, whereby termination 33 will be forced up ramp 41, over line 43 and down ramp 42 which, in the process, will cause a slight momentary elastic deformation or spreading therebetween, which return to their illustrated position due to the inherent resiliency of the material used to form indicator member 37. Thus, the two form a "snap-fit".

As can best be seen in FIG. 1, retainer 14 and insertion device 10 are angular positioned so that leg members 32 are interdigitated with and nominally positioned approximately 45 degrees from the respective adjoining finger members 26 of retainer 14 so that the two can be axially repositioned without interfering with one another. During insertion assembly, indicator device 10 is merely pressed into its position as illustrated in FIG. 2 wherein tabs 34 are momentarily elastically displaced radially inwardly as they pass over step 28 in female element 13.

Referring to FIGS. 2 and 3, during the mating process of connector 11, end 16 of male member 12 enters through passage 17, passing through the inner diameter of both indicator member 37 and annular member 31 as well as retainer skirt portion 22. Flange 15 of male element 12 is dimensioned for slip fit with respect to the inner surfaces of leg members 32. As the insertion process continues the leading (lowermost) edge of abutment flange 15 contacts the upwardmost abutment surface 45 of base member 31. Further downward displacement of male element 12 will carry insertion device 10 therewith. Insertion is complete when the leading (lowermost) edge 46 of annular base member 31, driven by circumferential flange 15, abuts seat 25. At this point, the trailing edge of flange 15 has passed downwardly facing abutment surfaces 30 of finger members 36 which then snaps radially inwardly, entrapping flange 15 as well as indicator device 10 in its designated installed position as illustrated in FIG. 3.

As can be best seen in FIG. 2, the axial spacing (X) between the point of abutment of transverse face 39 with female element 13 (wherein transverse faces 39 and 63 coincide) and the lowermost surface 46 of base member 31 is substantially less than the axial spacing (designated Y) of face 39 and seat 25. Thus, after the leading edge of flange 15, contacts surface 45 of base members 31, further displacement thereof will cause base member 31 and leg members 32 to move in unison therewith. This movement, will pull terminations 33 out of recesses 38 to effect separation thereof. In the parting process, the resiliency inherent in the indictor member 37 will cause line 43 and corner 44 to dimensionally spring toward one another, causing indicator member 37 to be actually ejected axially away from female element 13. Thereafter, it will be loosely retained on the portion of male element 12 leading away from the coupling in such a manner as to be clearly indicative of separation and thus a complete coupling has taken place.

Referring to FIG. 6, in its preferred embodiment, indicator member 37 comprises inner and outer concentric annular rings 47 and 48, respectively, axially joined by a thin web 49 throughout most the circumferential extent thereof. Although it is contemplated that indicator member 37 will be allowed to permanently encircle male element 12 throughout the life cycle of the fitting, it may be desirable to remove it after the coupling has been completed and verified. Thus, rings 47 and 48 are provided with radially extending through slits 50 and 51, respectively, whereby only the thin section of the web 49 at the location adjacent slits 50 and 51 structurally completes the member. If removal is desired, indicator member 37 can be removed by gripping it manually or with a tool and pulled radially away from male element 12, rupturing web 49 in the process. That portion of web 49 is designated as a rupture point 52.

Referring to FIG. 7, an alternative embodiment of the indicator member 37 is illustrated at 53 which differs only in that it has an approximately 90 degree sector removed therefrom to define a permanent opening between circumferential fingers 53 and 54 which are spaced approximately one half of the diameter of male element 12 to ensure that after coupling, indicator member 53 remains engaged with its associated male element 12 until it is intentionally removed therefrom. Removal is further enhanced by the provision of a generally planar finger tab 56 extending radially therefrom which is integrally formed therewith and optionally provided with instructional indicia 57.

Figure 8:
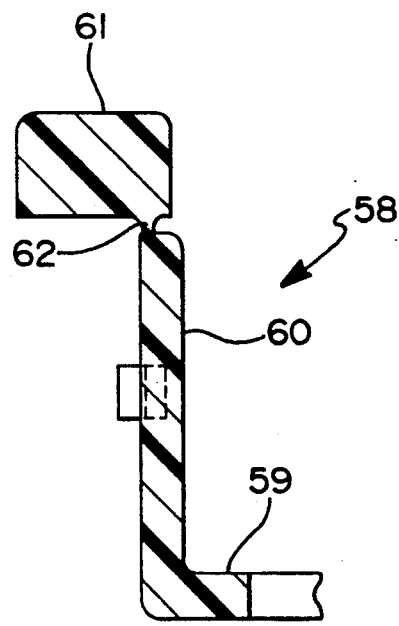
FIG. 8, is a broken sectional view of still another alternative embodiment of the present envision.

Referring to FIG. 8, a further embodiment of the invention is illustrated in which an insertion indicator device 58 including a base member 59 leg members 60 and indicator member 61 are integrally formed from suitable material such as injection molded plastic. Indicator device 58 operates as described as hereinabove with the exception that a termination 62 of leg embers 60 is in the form of a necked transition point with indicator member 61. With this embodiment, upon completion of the coupling process between male and female elements 12 and 13, base and leg members 59 and 60 are drawn downwardly by the flange 15 of the male member while indicator member 61 remains in fixed abutment with the open end of female element 13 resulting in tensile loading of leg members 60 and ultimate rupturing of the material at the neck formed at termination 62. Because the material is somewhat elastic, upon separation of indicator member 61 from leg members 60, indicator member 61 will tend to be ejected away from the quick connector in ensure its visibility as indicated by arrows 64 in FIG. 3.

It is to be understood that the invention has been described with references to a specific embodiment and variations to provide the features and advantages previously described and that the embodiments are susceptible of modification as will be apparent to those skilled in the art. For example, it is contemplated that leg members 32 could be replaced with a thin wall rupturable circumferentially continuous skirt. Accordingly, the foregoing is not to be construed in a limiting sense.

What is claimed is:

1. A quick connect insertion indicator comprising:
a generally annular base member carried with a connector housing adapted for positioning about a conduit;
at least one leg member extending axially from said base member and terminating adjacent an axial housing opening;
a generally annular indicator member for visually indicating proper coupling of said conduit disposed substantially concentrically adjacent said opening releasably engaging said leg member termination; and
means operative to axially displace said base and leg members upon engagement of said conduit and connector housing to effect separation of said leg and indicator members.

2. A quick connect insertion indicator comprising:
a generally annular base member adapted for positioning about a conduit within a connector housing;
a plurality of circumferentially spaced, axially extending leg members terminating externally adjacent a stepped axial housing opening;

a generally annular indicator member disposed substantially concentrically adjacent said opening releasably engaging said leg member terminations; and retention means carried by at least one of said leg members positioned axially inwardly and extending radially outwardly of said stepped opening for retention of said indicator when assembled with said connector housing, said base member defining an abutment surface disposed to engage a mating abutment surface defined by said conduit to axially displace said base and leg members upon engagement of said conduit and connector housing to effect separation of said leg and indicator members.

3. The quick connect insertion indicator of claim 2, wherein said base and leg members are integrally formed of injection molded plastic.

4. The quick connect insertion indicator of claim 2, wherein said base member has an outside diameter dimensioned slightly less than the inside diameter dimension of said axial housing step and an inside diameter dimensioned slightly greater than the nominal outside diameter dimension of said conduit and slightly less than the outside diameter dimension of said conduit abutment surface.

5. The quick connect insertion indicator of claim 2, wherein said indicator member has an inside diameter dimensioned slightly greater than the outside diameter dimension of said conduit abutment surface.

6. The quick connect insertion indicator member of claim 2, wherein said indicator member is integrally formed with said base and leg members, and said leg members include a predetermined weakened point operative to predictably fracture under axial loading to effect said separation.

7. The quick connect insertion indicator member of claim 2, wherein said indicator member is integrally formed with said base and leg members, and said indicator member includes at least one predetermined weakened point operative to predictably fracture under axial loading to effect said separation.

8. The quick connect insertion indicator of claim 2, wherein said indicator member includes at least one predetermined rupture point operative to enable removal thereof from said conduit after separation from said leg members.

9. The quick connect insertion indicator of claim 2, further comprising a generally planar tab member radially extending from said indicator member.

10. The quick connect insertion indicator of claim 9, wherein said tab member comprises visually sensible indicia.

11. The quick connect insertion indicator of claim 2, wherein said indicator member includes a circumferential opening therein.

12. The quick connect insertion indicator of claim 11, wherein said circumferential opening extends about 90 degrees.

13. The quick connect insertion indicator of claim 2, wherein said leg member terminations are matingly engaged within associated recesses formed within said indicator member.

14. The quick connect insertion indicator of claim 13, wherein said leg member terminations are snap-fit within said recesses.

15. The quick connect insertion indicator of claim 13, wherein said leg member terminations are generally bulbous shaped for interference passage by a necked restriction within each said recess.

16. The quick connect insertion indicator of claim 15, wherein said restriction is formed by axially extending adjacent radially decreasing and radially increasing ramped surfaces within each said recess.

17. The quick connect insertion indicator of claim 2, wherein said retention means comprise tangentially extending projections integrally formed with said leg member.

18. In combination:

a quick connector assembly including mating male and female elements and locking means operative to positively interconnect said elements in a fixed relative longitudinal orientation, said female element defining a housing portion substantially enclosing said locking means, said housing portion forming a radially inwardly directed step at an open end thereof for receiving said male element and a seat at an end opposed from said open end, said male element defining an external annular bead dimensioned to be nestingly received by said seat, and said locking means defining a plurality of circumferentially spaced, axially extending resilient finger members defining radially inwardly directed ramp surfaces and abutment surfaces at an end thereof distal said housing open end operative to entrap said bead between said seat and abutment surfaces; and an insertion indicator including a generally annular base member disposed about said male element within said female element, said insertion indicator further including a plurality of circumferentially spaced, axially extending legs carried by said base member and terminating adjacent said open end, a generally annular indicator member disposed substantially concentrically adjacent said open end releasably engaging said leg member terminations, and retention means carried by at least one of said leg members positioned axially inwardly and extending radially outwardly of said step for retention of said indicator when assembled with said housing portion, said base member defining an internal abutment surface disposed to engage said annular bead to axially displace said base and leg members upon interconnection of said elements to effect separation of said leg and indicator members.

19. The combination of claim 18, wherein said finger members are equally circumferentially spaced.

20. The combination of claim 19, wherein said leg and finger members are circumferentially interdigitated.

21. The combination of claim 20, wherein said retention means extends circumferentially substantially between the finger members straddling each said leg member.

22. The combination of claim 20, wherein there are four finger members and two leg members.

23. The combination of claim 18, wherein during engagement said base member abutment surface is axially spaced from a transverse face of said indicator member adjacent the open end of said female element (dimension X), and said seat is axially spaced from an open end transverse face of said female element (dimension Y), wherein Y is greater than X.

24. The combination of claim 23, wherein said leg member terminations are bulbous shaped for interference snap-fit engagement with associated necked recesses formed within said indicator member, said bulbous shape characterized by a nominal diameter of dimension D measured in the axial direction, wherein Y is approximately equal to X plus D.

25. The combination of claim 18, wherein said insertion indicator further comprises resilient means operative to forcefully eject said indicator member axially away from said quick connector assembly upon separation of said indicator and leg members.

26. The combination of claim 18, further comprising a radially outwardly directed stem portion integrally formed intermediate each said leg member and associated termination.

* * * * *